United States Patent [19]

Kobayashi

[11] 3,743,959

[45] July 3, 1973

[54] VARIABLE EQUALIZER

[75] Inventor: Hirokazu Kobayashi, Tokyo, Japan

[73] Assignee: Nippon Electric Company, Ltd., Tokyo, Japan

[22] Filed: Dec. 21, 1970

[21] Appl. No.: 99,856

[30] Foreign Application Priority Data

Dec. 23, 1969 Japan ............................ 44/104105

[52] U.S. Cl. .................................... 330/31, 330/21
[51] Int. Cl. ............................................... H03x 3/04
[58] Field of Search ........................... 330/21, 31, 94

[56] References Cited

UNITED STATES PATENTS 3,407,360 10/1968 Buhr ................................ 330/31 X
3,486,126 12/1969 Chin et al. ........................ 330/21 X
3,316,360 4/1967 Coleman Jr. et al. .............. 330/21X

*Primary Examiner*—Roy Lake
*Assistant Examiner*—Lawrence J. Dahl
*Attorney*—Sandoe, Hopgood & Calimafde

[57] ABSTRACT

A variable equalizer requiring no inductive elements comprises a pair of four-terminal networks having selected external impedance characteristics. Variable impedance elements are connected to the output terminals of the four-terminal networks, and a third network, having an impedance transfer function proportional to the input impedance ratio of the two four-terminal networks, is connected to the input terminals of the latter networks.

4 Claims, 4 Drawing Figures

PATENTED JUL 3 1973 3,743,959

INVENTOR.
HIROKAZU KOBAYASHI
BY
Sandoe, Hopgood & Calimafde
ATTORNEYS

VARIABLE EQUALIZER

This invention relates generally to equalizers, and more particularly to a variable equalizer having a novel circuit configuration. An equalizer is a passive circuit device designed to compensate for an undesired amplitude-frequency and/or phase-frequency characteristic of an electrical or electronic system or component.

In most of the conventional variable equalizers which comprise several two-terminal networks of inverse circuit configuration, capacitance and inductance elements are required, and it is thus impossible to realize a variable equalizer of the known design in the form of an integrated circuit (IC). This is mainly due to the fact that it is very difficult to form an inductance in the form of an IC. In the conventional variable equalizer, therefore, discrete circuit elements must of necessity be used.

It is an object of this invention to provide a variable equalizer formed without the use of an inverse network or inductance elements when the loss characteristic deviation of the equalizer, caused by frequency deviation, should be unidirectional as in a cable.

The variable equalizer of this invention comprises a pair of four-terminal networks which have their external characteristics identical to each other, or different from each other only with respect to their impedance levels. Two variable impedance elements are connected to the output terminals of the pair of networks and are operated as mutually inverse variable impedances. Another network having a transfer function proportional to the input impedance ratio of the pair of networks has its terminals connected to the input terminals of the pair of networks.

The method of analyzing a variable equalizer proposed by H. W. Bode is well-known (Reference: BSTJ, April, 1938, pp. 229–244). This method is based on the following principle. When the transfer function $T$ of a four-terminal network N including a variable impedance element $R$ is expressed as $$T = e^{-\theta} \quad o \cdot X + e^{\varphi} \quad /1 + X\, e^{\varphi} \tag{1}$$

where $$X = R / R_o \tag{2}$$

$R_o$ is a constant impedance with the same dimension as $R$ $\theta_o$, $\phi$ are constants determined by $N$ and $R_o$ independently of $R$ the transmission loss $\theta$ is $$\theta = -\log T = \theta_o + Y\phi + C_3\phi^3 + \ldots \tag{3}$$

where $Y = X - 1/X + 1$ $$C_3 = (Y/12)\,(1 - Y^2) \tag{4}$$

This method is characterized by the variable characteristic of the transmission loss $\theta$ which varies with the variation of the value of R, when the third and following terms on the right side of Equation (3) are negligible with respect to the second term, in such a manner that the shape of the frequency characteristic is constant, and only its loss characteristic varies by the amounts determined by $R$ (because $\theta_o$ is a constant loss and $Y$ is determined by $R$). It is, however, necessary to use the conventional inverse two-terminal networks which in turn require capacitance and inductance elements in order to realize a circuit satisfying Equation (1) and having a satisfactory variation range of the loss characteristic.

To the accomplishment of the above and to such further objects as may hereinafter appear, the present invention relates to a variable equalizer substantially as defined in the appended claims and as described in the following specification taken together with the accompanying drawing in which:

FIG. 1 illustrates a conventional equalizer, wherein impedance $Z_1$ is an inverse circuit of impedance $Z_2$. A further description of this circuit is omitted in this specification since this circuit is described in sufficient detail in the above-mentioned Bode article.

Figures 1, 2, 3:
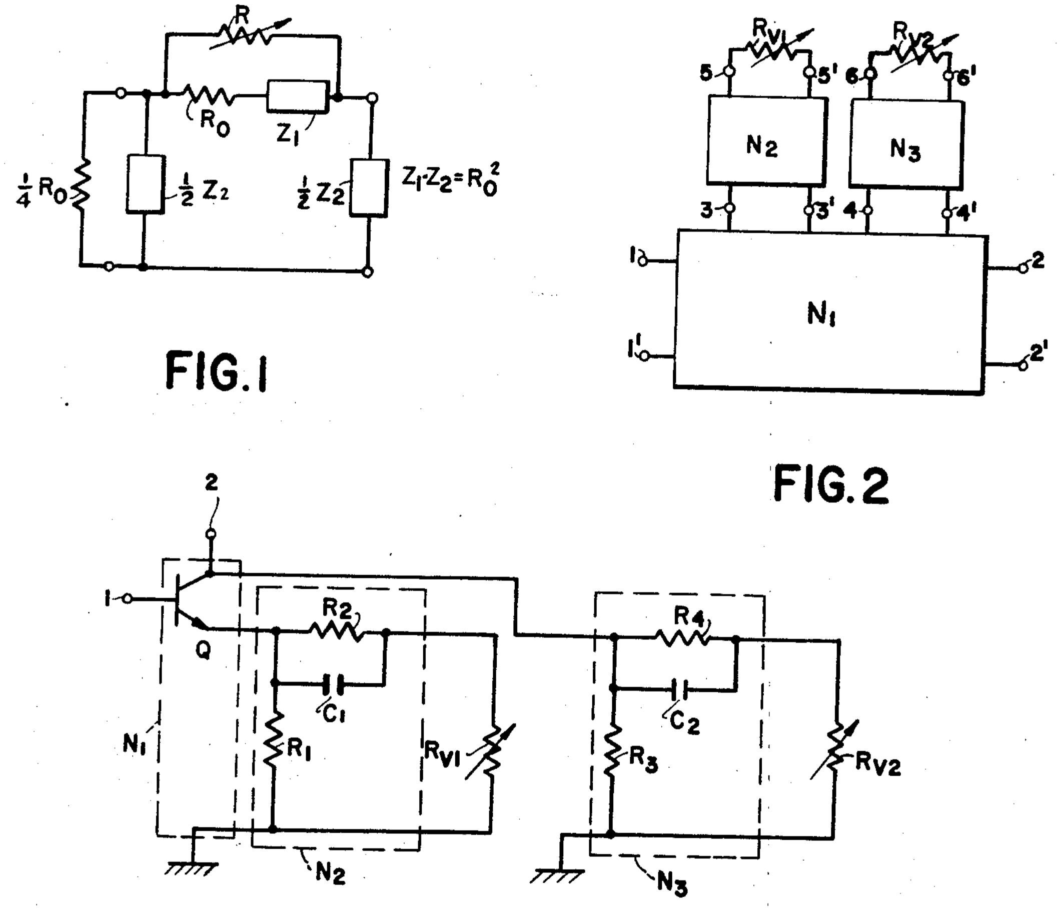
FIG. 1 is a circuit diagram of a conventional variable equalizer.
FIG. 2 is a block diagram of a variable equalizer according to this invention.
FIG. 3 is a circuit diagram of a variable equalizer according to an embodiment of this invention.

FIG. 2 is a block diagram showing a variable equalizer of this invention. The four-terminal networks $N_2$ and $N_3$ shown therein have their input-output characteristics identical to each other, or are different from each other only with respect to their respective impedance levels. Variable impedance elements $R_{v1}$ and $R_{v2}$ respectively coupled to terminals 5–5' and 6–6' of networks $N_2$ and $N_3$, satisfy the following equation.

$$R_{v1} \cdot R_{v2} = a\, R_o^2 \tag{5}$$

where $R_o$ is a constant impedance with the same dimension as impedance elements $R_{v1}$ and $R_{v2}$, and $a$ is the impedance level ratio of networks $N_2$ to $N_3$.

A network $N_1$ has a group of intermediate terminals that are coupled respectively to the terminals 3–3' and 4–4' of networks $N_2$ and $N_3$. Network $A_1$ has a transfer function between its input and output terminals 1, 1' and 2, 2' that is given by the following equation, $$T = P \cdot Z_2/Z_1 \tag{6}$$

where $Z_1$ is an impedance of network $N_2$ looking from network $N_1$, $Z_2$ is an impedance of network $N_3$ looking from network $N_1$, and $P$ is a function only of network $N_1$. Network $N_1$ can be easily realized by the use of an active circuit.

Assuming that the impedances of network $N_2$ looking from terminals 3 and 3' when terminals 5 and 5' are opened and shorted are $Z_{1o}$ and $Z_{1s}$ respectively, that the impedance of the network $N_2$ looking from the terminals 5 and 5' when terminals 3 and 3' are opened and shorted are $Z_{2o}$ and $Z_{2s}$ respectively, and that the impedance level of network $N_3$ is $a$-times that of $N_2$ network, then impedances $Z_1$ and $Z_2$ are expressed as $$Z_1 = Z_{1o} \cdot (R_{v1} + Z_{2s}/R_{v1} + Z_{2o})$$
$$Z_2 = aZ_{1o} \cdot (R_{v2} + aZ_{2s}/R_{v2} + aZ_{2o}) \qquad (7)$$

The factor $a$ in Equation (7) is the same as that in Equation (5).

Substituting Equations (5) and (7) for Equation (6), we obtain $$T = aP \cdot (R_{v1} + Z_{2o})/(R_{v1} + Z_{2s}) \cdot (R_{v2} + aZ_{2s})/(R_{v2} + aZ_{2o})$$

$$= aP \cdot \frac{\frac{R_{v1}}{R_o} + \frac{Z_{2o}}{R_o}}{1 + \frac{Z_{2o}}{R_o} \cdot \frac{R_{v1}}{R_o}} \cdot \frac{\frac{R_{v1}}{R_o} + \frac{R_o}{Z_{2s}}}{1 + \frac{R_o}{Z_{2s}} \cdot \frac{R_{v1}}{R_o}}$$

$$= e^{-\theta_o} \cdot (X + e^{\varphi 1})/(1 + Xe^{\varphi 1}) \cdot (X + e^{\varphi 2})/(1 + Xe^{\varphi 2}) \qquad (8)$$

where $$e^{-\theta 0} = aP$$
$$X = R_v1/R_o \qquad (9)$$

$$e^{\varphi 1} = Z_{2o}/R_o$$
$$e^{\varphi 2} = R_o/Z_{2s}$$

Furthermore the transmission loss $\theta$ of the network is $$\theta = -\log T = \theta_o + Y(\phi_1 + \phi_2) + C_3(\phi_1^3 + \phi_2^3) + \ldots$$
$$= \theta_o + Y\phi + C_3(\phi^3 - 3\phi\,\varphi_1\,\varphi_2) + \ldots\ldots \qquad (10)$$

where $$\phi = \phi_1 + \phi_2 = \log Z_{2o}/Z_{2s} = \log Z_{1o}/Z_{1s} \qquad (11)$$

and $Y$ and $C_3$ are the same symbols as employed in Equation (4).

A comparison of Equations (8) and (10) with Equations (1) and (3) makes it evident that the variable equalizer of this invention has a function equivalent to that of the two cascade-connected variable equalizers proposed by Bode.

The variation characteristifc of the equalizer of this invention is determined by $Z_{2o}/Z_{2s}$ or $Z_{1o}/Z_{1s}$. Thus, by choosing the impedance level ratio of $Z_{2s}$ and $Z_{2o}$ versus $R_o$, it is possible to adjust the distribution of $\phi_1$ and $\phi_2$ and to minimize the deviation therebetween, corresponding to the third and following terms of the right-hand side of Equation (10).

FIG. 3 illustrates an embodiment of this invention, wherein the references $N_1$, $N_2$, $N_3$, $R_{v1}$ and $R_{v2}$ correspond to the references $N_1$, $N_2$, $N_3$, and $R_{v1}$ and $R_{v2}$ in FIG. 2. The values of these elements are determined as follows.

$$aR_1 = R_3$$
$$aR_2 = R_4 \qquad (12)$$
$$C_1 = aC_2$$

Assuming that the current amplification factor, the base resistance, and the emitter resistance of the grounded-emitter transistor Q are $\beta$, $r_b$, and $r_e$ respectively and that the input impedances of networks $N_2$ and $N_3$ are $Z_1$ and $Z_2$ respectively, the transfer function from terminal 1 to 2 is expressed as $$T = [Z_2/r_b/\beta + r_e + Z_1] \qquad (13)$$

Assuming that $$r_b/\beta + r_e << Z_1 \qquad (14)$$

Equation (13) is reduced to $$T = Z_2/Z_1 \qquad (15)$$

Equation (6) is satisfied, and the variation characteristic of this invention is, therefore, derived from Equation (11) as follows:

$$e^{\varphi} = [Z_1(R_{v1} = \infty)/Z_1(R_{v1} = 0)] = (R_1 + R_2/R_2) \cdot [1 + \gamma\omega C_1 \cdot (R_1 \cdot R_2/R_1 + R_2)] \qquad (16)$$

Figure 4:
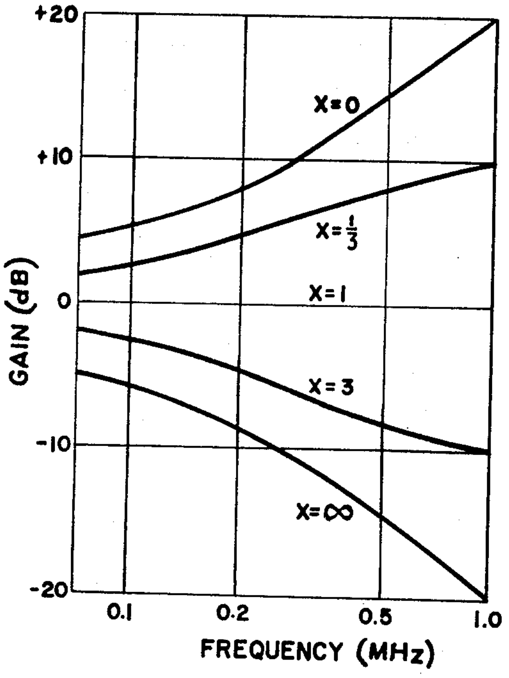
FIG. 4 is a diagram showing the characteristics of the variable equalizer shown in FIG. 3.

FIG. 4 shows the variation characteristic curves for values of $x$ equal to 0, ⅓, 1, 3 and ∞, for values of the circuit elements in FIG. 3 as follows.

$$R_1 = R_3 = 780\ \Omega$$
$$R_2 = R_4 = 500\ \Omega$$
$$C_1 = C_2 = 3{,}120 pF$$
$$R_o = 400\ \Omega$$

Practically, these values are obtained by an aprpoximation in response to the required characteristics.

Inequality (14) applies for most generally used transistors such as the 2SC – 356 manufactured and sold by Nippon Electric Company. When that transistor is used in the circuit of FIG. 3 with the circuit element values listed above, $r_b$, $\beta$ and $r_e$ in Equation (13) are 50 ohm, 100 and 2.5 ohm respectively.

Thus $(r_b/\beta) + r_e = (50/100) + 2.5 = 3$ohm as compared to a value of impedance $Z_1$ of between 50ohm and 780ohm.

As has been mentioned above, the variable equalizer according to this invention can be constructed without using inductance elements and can thus be easily realized by an IC.

In the above description, it is assumed that the product of the values of the two variable impedance elements is constant. However, this limitation is not always necessary for the purpose of this invention. For example, when the values of the two variable impedance elements are inversely determined or, in other words, when the value of one element increases as the value of the other decreases, the variable equalizer with a somewhat different deviation characteristic can operate equally as the one described above. This is because the variation characteristic $\phi$ does not include $R_o$ as clarified in Equations (10) and (11).

Furthermore, although only one specific embodiment (as in FIG. 3) of the invention has been illustrated in detail, it is particularly understood that several modifications are conceivable, without departing from the spirit and scope of the invention.

I claim:

1. A variable equalizer comprising:

a first two-port network having a first port terminated by a first variable impedance element and a second port, the input impedance ($Z_1$) of said first two-port network looking from said second port being given approximately by $$Z_1 = Z_{1o} \cdot (R_{v1} + Z_{2s}/R_{v1} + Z_{2o})$$

where $Z_{1o}$ is the impedance of said first two-port network looking from said second port for the open state of said first port $Z_{2o}$ and $Z_{2s}$ are the impedances of said first two-port network looking from said first port for the open and closed states of said second port, respectively, and $R_{v1}$ is the impedance of said first variable impedance element; a second two-port network having a third port terminated by a second variable impedance element and a fourth port, the input impedance ($Z_2$) of said second two-port network looking from said fourth port being given approximately by $$Z_2 = zA_{1o} \cdot (R_{v2} + aZ_{2s}/R_{v2} + aZP_{2o})$$

where the constant $a$ is a positive real number, and $R_{v2}$ is the impedance of said second variable impedance element and equal to $aRo^2/R_{vi}$; a four-port network having a fifth port connected to said second port, a sixth port connected to said fourth port, and seventh and eighth ports, the transfer function of the circuit section between said seventh port and said eighth port being equal to $PZ_1/Z_2$, where P is a constant determined only by said four-port network, the input signal of said equalizer being supplied to said seventh port and the output signal of said equalizer being obtained at said eighth port.

2. The variable equalizer of claim 1, in which said first and second four-terminal networks each comprise a passive circuit containing no inductances, and said third network includes an active element.

3. The variable equalizer network of claim 3, in which said third network active element is transistor having base, collector, and emitter terminals, said first four-terminal network including first and second resistors coupled to said emitter terminal, and a capacitor coupled across one of said first and second resistors, said first variable impedance being coupled across said first and second resistors.

4. The variable equalizer of claim 4, in which said second four-terminal network comprises third and fourth resistors connected to said collector terminal, and a second capacitor coupled across one of said third and fourth resistors, said second variable impedance being coupled across said third and fourth impedances.

* * * * *

UNITED STATES PATENT OFFICE
CERTIFICATE OF CORRECTION

Patent No. 3,743,959 Dated July 3, 1973

Inventor(s) Hirokazu Kobayashi

It is certified that error appears in the above-identified patent and that said Letters Patent are hereby corrected as shown below:

Column 6, Claim 3, line 17, "3" should be --2--.

Claim 4, line 26, "4" should be --3--.

Signed and sealed this 20th day of November 1973.

(SEAL)
Attest:

EDWARD M.FLETCHER,JR.
Attesting Officer

RENE D. TEGTMEYER
Acting Commissioner of Patents